Figure 1:
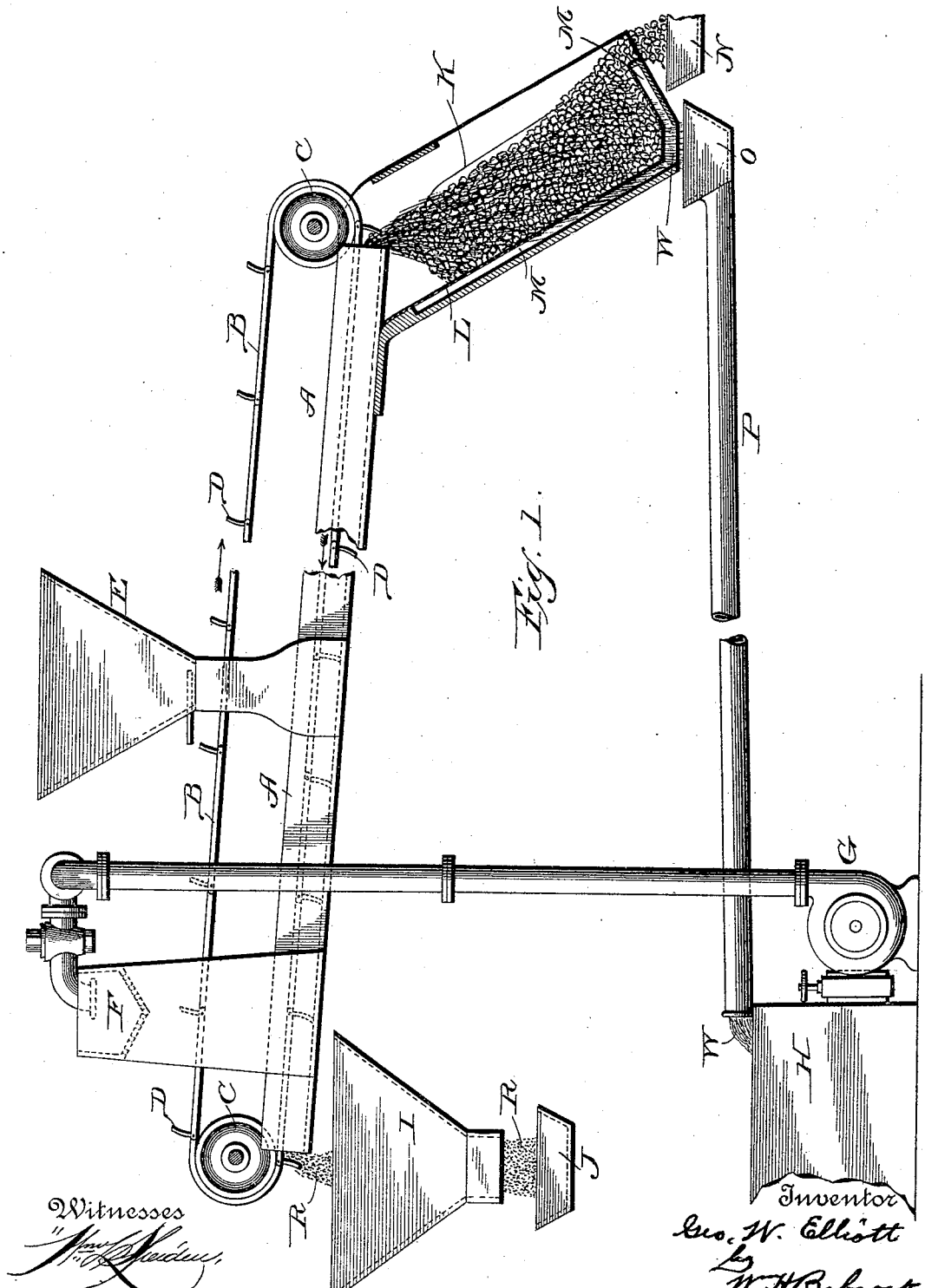

No. 616,831. Patented Dec. 27, 1898.
G. W. ELLIOTT.
FUEL WASHING AND FILTERING APPLIANCE.
(Application filed Mar. 31, 1898.)
(No Model.) 2 Sheets—Sheet 1.

Witnesses
George M. Richards.

Inventor
Geo. W. Elliott
by W. H. Babcock
Attorney

THE NORRIS PETERS CO., PHOTO-LITHO., WASHINGTON, D. C.

No. 616,831. Patented Dec. 27, 1898.
G. W. ELLIOTT.
FUEL WASHING AND FILTERING APPLIANCE.
(Application filed Mar. 31, 1898.)
(No Model.) 2 Sheets—Sheet 2.
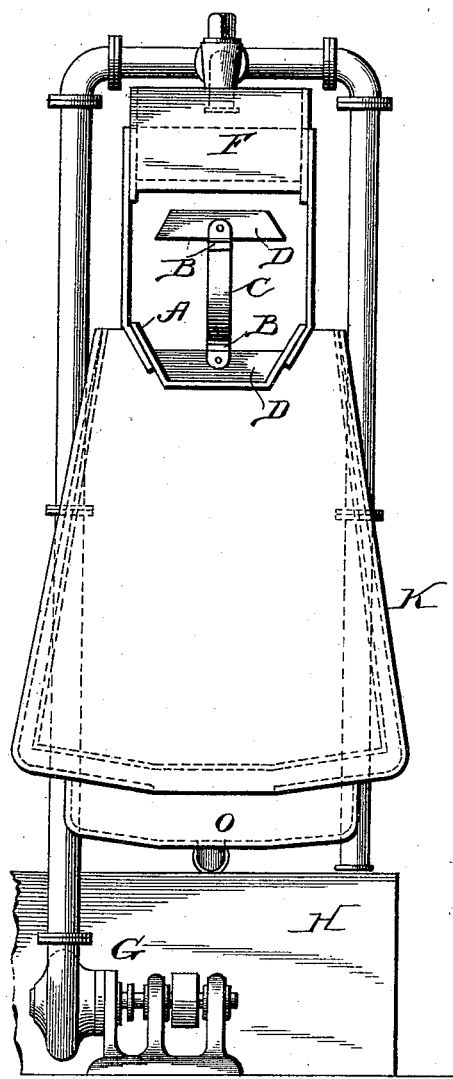
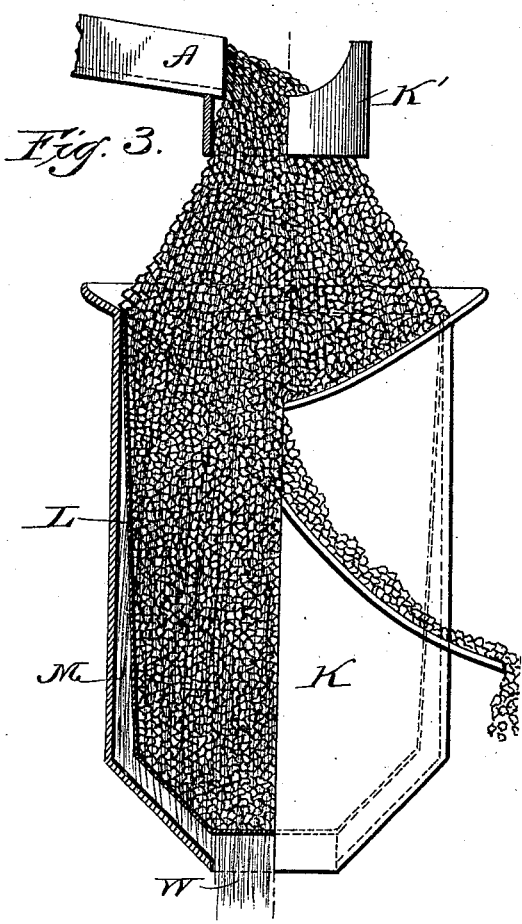
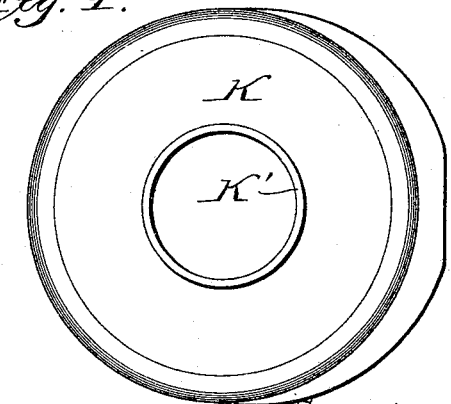
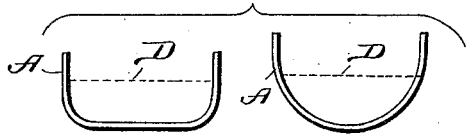

UNITED STATES PATENT OFFICE.

GEORGE WILLIAM ELLIOTT, OF DRONFIELD, ENGLAND.

FUEL WASHING AND FILTERING APPLIANCE.

SPECIFICATION forming part of Letters Patent No. 616,831, dated December 27, 1898.

Application filed March 31, 1898. Serial No. 675,986. (No model.)

*To all whom it may concern:*

Be it known that I, GEORGE WILLIAM ELLIOTT, mining-engineer, a subject of Her Britannic Majesty, residing at The Elms, Coal Aston, Dronfield, in the county of York, England, have invented certain new and useful Improvements in Fuel Washing and Filtering Appliances; and I do hereby declare the following to be a full, clear, and exact description of the invention, such as will enable others skilled in the art to which it appertains to make and use the same.

Heretofore coal and coke have been separated from their accompanying impurities by specific-gravity action while being floated or carried slowly along by water in sluiceways or flumes. The impurities, being heavier than the fuel, naturally fall to the bottom of such ways, from whence they have to be removed by hand labor. The fuel, being lighter, floats away and is ultimately discharged with the water by chutes into large cisterns or receptacles, portions of the sides whereof are fitted with gratings to allow the water to run to waste while retaining the fuel until such receptacles become filled with fuel, whereupon the stream of water and fuel is diverted and turned into another similar receptacle, which in its turn is likewise filled up. Meanwhile the fuel collected in the first-named receptacle, after partial draining, has to be removed by hand labor to become again ready for receiving a further charge. The whole process thus involves considerable care and expense, while the water discharged is so foul, by reason of its being loaded with fuel in a fine state of division, as to be totally unfit for further use without separate treatment and cannot be safely pumped or dealt with by mechanical means.

The object of my invention is to practically remove (as it issues from the lower end of the sluiceway) and so utilize all the pulverulent fuel from the water automatically and continuously by causing all the water (as it issues from the lower end of the sluiceway) to pass through a sufficient mass of the washed fuel operating as a filter and so arranged that the driest portion of such fuel whenever present in excess is free to fall away outwardly to be conducted clear away. Meanwhile the water, being cleared by its passage through the inner portion of the mass of fuel, escapes through preforations in the closed sides and bottom of the framing or comparatively small receptacle which receives the stream. The water as it issues is collected and led away to a suitable cistern, from which it may be continuously circulated through the apparatus by any well-known means. All the while I also automatically intercept and remove all the impurities by means of shallow stops or scrapers slowly moving along the bottom of the sluiceway in the opposite direction to the current of water—that is to say, moving from the lower to the upper end of the sluice—so that while the water and fuel together pass over the scrapers and escape at the lower end the impurities are not only retained, but carried away to the upper end of sluice and are there delivered automatically in a comparatively dry state, also without attention, the various mechanical movements being obtained by the employment of any convenient source of power. These objects may be obtained by the method or means shown and illustrated typically in the accompanying drawings, in which—

Figure 1 represents by side elevation, partly in section, an entire apparatus. Fig. 2 is a view of the fuel-delivery end of the same; Fig. 3, a vertical elevation, half being in section, of an alternative construction of filtering device; Fig. 4, a top view of same. Fig. 5 likewise shows alternative end views of sluiceways, the shapes being equally well adapted to preserve the efficiency of the scrapers, notwithstanding wear by frictional contact with such sluiceways.

Similar letters refer to similar parts throughout the several views.

A is the sluiceway, any number of which may be used and fixed side by side, one end whereof must be fixed at an incline at such a lower elevation than the other as to produce the necessary current of the water.

B is an endless chain which is put in motion and driven by pulleys C C. Upon this chain are fixed a suitable number of cross-pieces D, which in breadth should not exceed two-thirds of the depth of the sluice A, while both ends and one edge are shaped to secure a fair working fit with the insides and bottom of the sluice in order to intercept and carry away the impurities thrown down by the flow of water and fuel over the upper edges of such scrapers D. A suitable hopper or chute E, having in its lower portion means for regulating the supply of the impure fuel, is fixed over the sluiceway A at about midway in the length of such sluice, and a box or cistern F, also having means for regulating and distributing water, is fixed over the sluice A at about one-twelfth distance from the upper extremity of said sluice.

The operation or process will now be as follows: The chain being in motion, a proper quantity of water having been admitted to the sluice A by means of regulator in F, the impure fuel is in like manner delivered from E, will fall into the stream of water, and will mix therewith, partaking of its motion until partially arrested by the advancing scrapers D, whereupon portions of mixed solids will be carried against the stream upward, while the lighter fuel will be carried over the scrapers successively downward until finally both fuel and water fall into a receptacle K, which acts to arrest the fuel and also as a filter for the now turbid water. In Fig. 1 this framework or box is shown placed with its back or closed side at an angle to the vertical, the lower end being partially closed or carried outward to such an extent as together form a support for the fuel until the height of the mass of such fuel shall in relation to the base form such an angle as exceeds the angle of rest corresponding to that material, whereupon all further accessions of fuel to the top of the mass will tend to push away and down the open side a corresponding amount of fuel from which the water has been separated.

The alternative form of filter, Fig. 4, Sheet 2, acts in precisely the same manner, the only difference being that K is an open-topped receptacle closed on all its sides and stands vertically under sluice A or a continuation thereof, the mixed fuel and water being delivered into an open framework or guide K', fixed at a sufficient height above K as to cause the mass of cleansed fuel to assume the form of a truncated cone or pyramid whereof the side angles exceed the angle of rest for such fuel, which thereupon falls away and is conducted down suitable shelving guides formed around K.

In either case the filter K is formed or fitted with grates or perforated plates L, extending around the sides and forming a bottom whereon the fuel may rest, an open space M being left between plates L and body of K to permit of the passage of the cleansed water W, which falls into collector O and is conveyed by pipe P to receiving-cistern H, from which it is, by means of a suitable pump G, returned to water-supply box F. The cleansed fuel is carried away as it falls by means of chute N or other desired means.

Having now traced the action upon the fuel and the water, I will describe the operation in respect of the impurities. Each of the stops or scrapers D will in the first instance arrest a mixture of solids consisting, mainly, of impurities with more or less fuel; but as the scrapers move along against the current and pass the fuel-supply point the entangled fuel being agitated by motion of the water will be freed and enabled to flow away over the top edge of said scrapers until by the time each scraper has reached the point of water-supply F nothing but impurities remain before the scrapers D, which are now traveling in a dry part of sluiceway A, thereby enabling the said scrapers to eject the refuse R from the upper end of the sluice, whence it may fall into a hopper I and be carried by chute J finally away, as required.

I am aware that prior to my invention apparatus have been devised for the concentration of metallic ore shaving inclined sluiceways or flumes, also with chain-actuated scrapers or with brushes to effect the delivery of such ore, the impurities in all such cases being allowed to escape with the water, and although such apparatus and devices are totally unfit and useless for the removal of impurities from fuel I do not claim such a combination broadly; but What I do claim as my invention, and desire to secure by Letters Patent, is—

1. In a fuel-washing mechanism, a filter having vertical sides with outwardly-shelving, angularly-placed chutes to receive and deliver the washed fuel, fitted internally with perforated plates extending around the sides and across the bottom and leaving a space between the outer case and perforated plates for the escape of water after it has percolated through a mass of fuel resting on a layer of graded mineral stuff, in combination with a conduit conducting the water from the said filter, a receptacle into which the said conduit empties, a pump which withdraws the water from the said receptacle, a cistern supplied by the said pump, a sluice receiving the water from the said cistern and supplying it to the said filter, and a hopper discharging fuel into the said sluice above the filter, the latter being of such dimensions, arrangement and construction that the accumulation of washed fuel forms a cone or pyramid whereof the side angles exceed the angle of rest corresponding to such material, whereby further accessions of material to the top of the mass tend to push outwardly a corresponding amount of fuel from which the water has been separated, the fuel thus dislodged being conducted automatically away along the angular delivery-chutes before mentioned, substantially as set forth.

2. In a fuel-washing apparatus, an open-top box-filter having vertical sides with outwardly-shelving angularly-placed chutes to receive and deliver the washed fuel, fitted internally with a series of perforated plates extending around the sides and across the bottom in such manner as to leave a cavity or space between the outer case and such perforated plates by which water may escape after percolating through a given mass of fuel collected and resting upon a layer of graded mineral stuff together acting as a filter for purifying the water in passing through such mass; a collecting spout or conduit to convey the water into a cistern from which a pump withdraws the water and returns it to an inlet-cistern fitted with a regulator and fixed over a main sluice delivering water at about one-twelfth of the length thereof in distance from the top end of such sluice to thereby use over again such water continuously; a hopper or receiving-box having its bottom and top open being fixed under the main sluice above the said filter and separated therefrom by such a space or height as shall cause the accumulation of washed fuel to form a truncated cone or pyramid whereof the side angles exceed the angle of rest corresponding to such material, whereby further accessions of fuel to the top of the mass shall tend to push outwardly a corresponding amount of fuel from which the water has been separated and be conducted automatically away along the angular delivery-chutes before mentioned, all substantially as described and illustrated.

In testimony whereof I have affixed my signature in presence of two witnesses.

GEORGE WILLIAM ELLIOTT.

Witnesses:
 ISAAC BECK,
 CHARLES HENRY BEDFORD.